Figure 1:
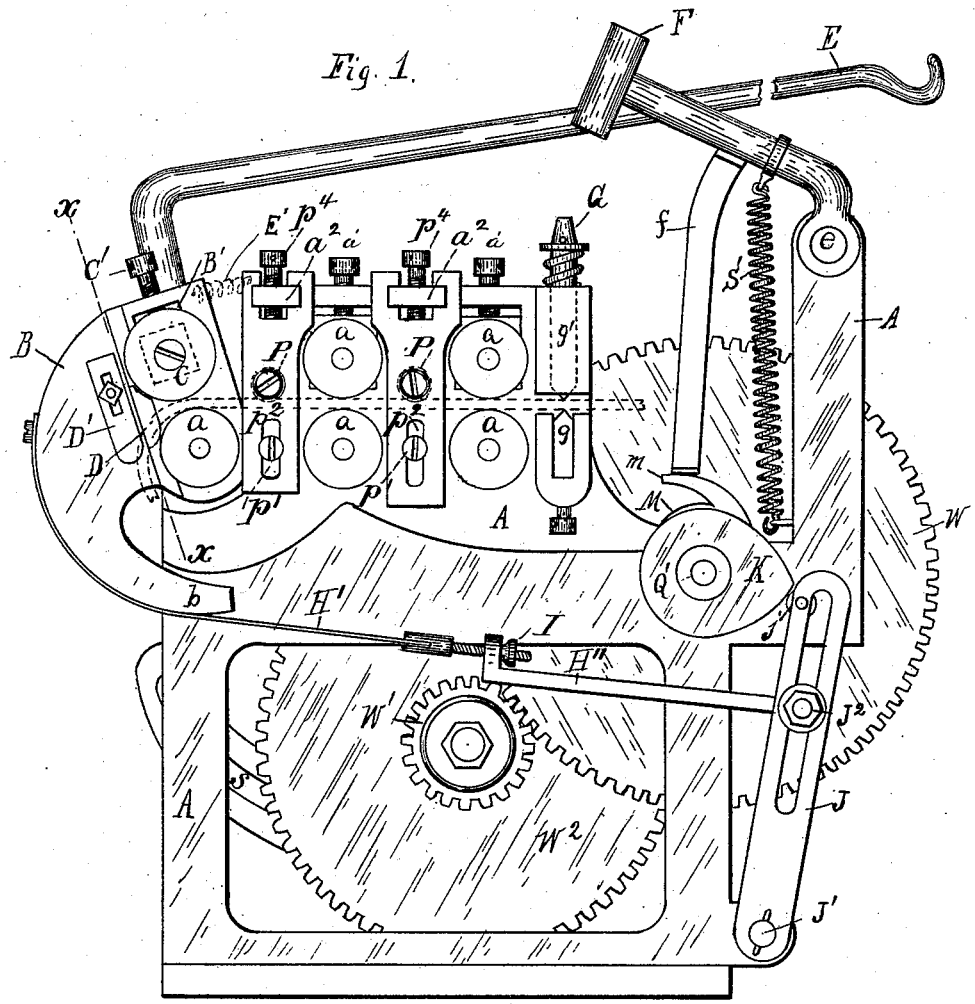

(No Model.) 5 Sheets—Sheet 1.

G. HILDRETH.
WIRE COILING MACHINE.

No. 347,350. Patented Aug. 17, 1886.

WITNESSES
C. H. Hallister Jr.
John T. Booth

INVENTOR
George Hildreth
by Geo. A. Mosher
atty.

(No Model.)  5 Sheets—Sheet 2.
G. HILDRETH.
WIRE COILING MACHINE.
No. 347,350. Patented Aug. 17, 1886.
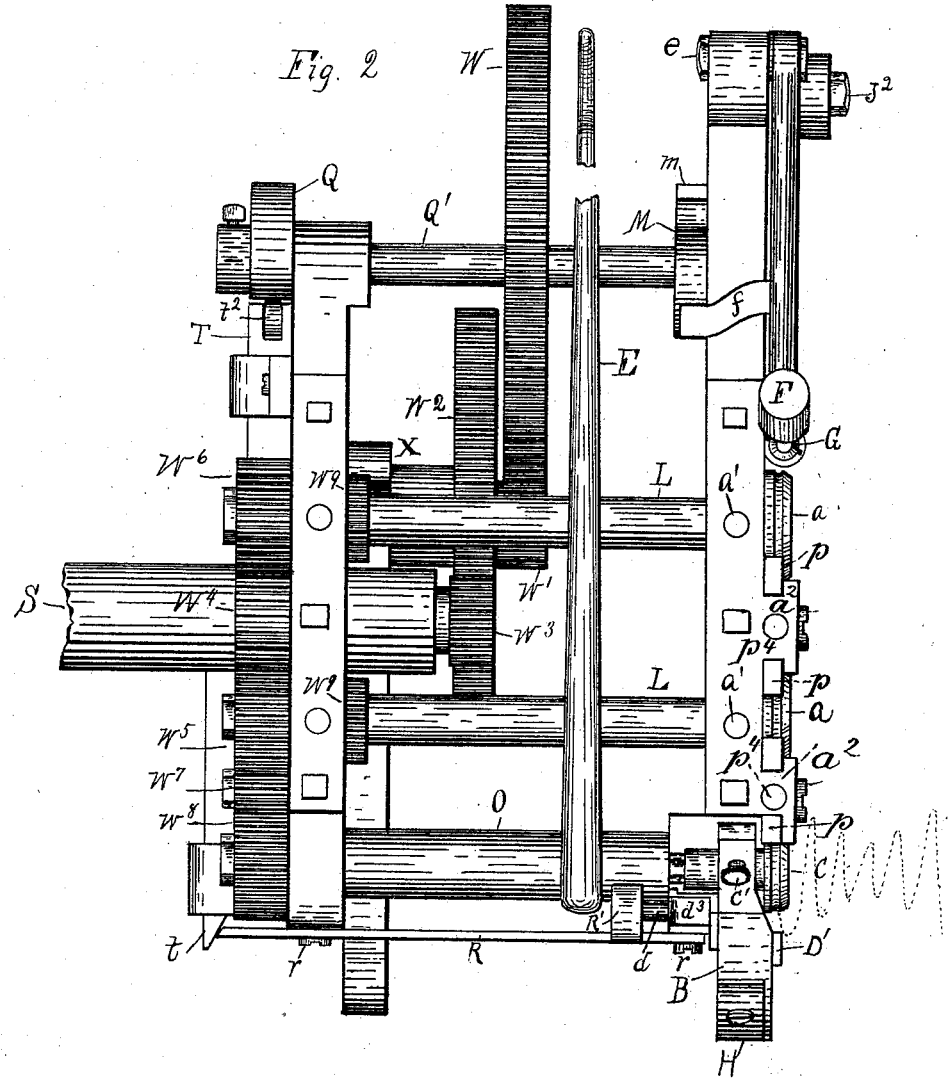

(No Model.)  5 Sheets—Sheet 3.
G. HILDRETH.
WIRE COILING MACHINE.
No. 347,350. Patented Aug. 17, 1886.
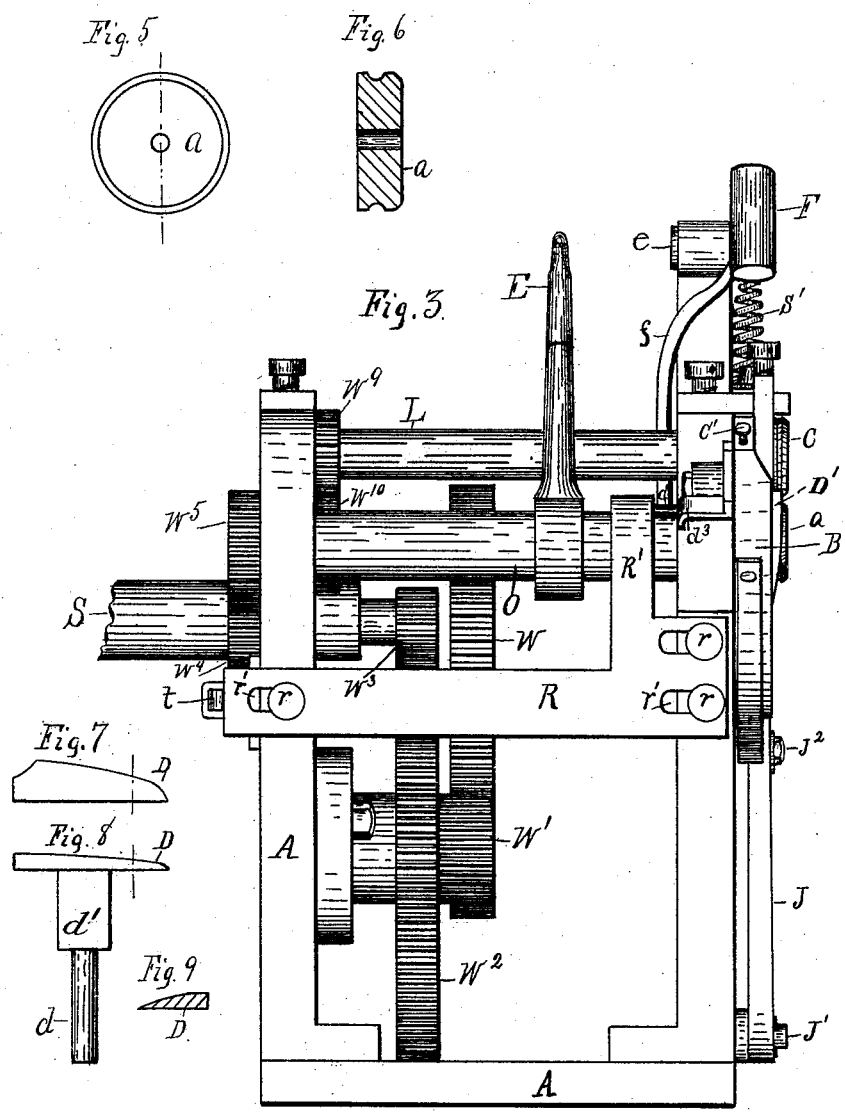
WITNESSES
W. H. Hollister Jr.
John T. Booth
INVENTOR
George Hildreth
by Geo. A. Mosher
atty.

(No Model.)  5 Sheets—Sheet 4.
G. HILDRETH.
WIRE COILING MACHINE.

No. 347,350. Patented Aug. 17, 1886.

WITNESSES INVENTOR (No Model.)  5 Sheets—Sheet 5.

G. HILDRETH.
WIRE COILING MACHINE.

No. 347,350.  Patented Aug. 17, 1886.

WITNESSES
W. H. Hallister Jr.
John F. Booth

INVENTOR
George Hildreth
by Geo. A. Mosher
atty.

UNITED STATES PATENT OFFICE.

GEORGE HILDRETH, OF TROY, NEW YORK, ASSIGNOR TO GEORGE W. PERCY AND JOHN E. GAITLEY, BOTH OF SAME PLACE.

WIRE-COILING MACHINE.

SPECIFICATION forming part of Letters Patent No. 347,350, dated August 17, 1886.

Application filed December 31, 1885. Serial No. 187,252. (No model.)

*To all whom it may concern:*

Be it known that I, GEORGE HILDRETH, a resident of the city of Troy, in the county of Rensselaer and State of New York, have invented certain new and useful Improvements in Wire-Coiling Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

The object of my invention is to bend wire into coils of various kinds—such as a continuous spiral or a connected series of conical helices or helispherical coils adapted to be cut or severed at intervals to form separate spiral or helical coils—in such a manner that the successive coils or helices in a series shall be uniform in shape and size. Various devices have heretofore been employed for this purpose, whereby wire has been forced by feed-rolls against a loose forming-roll adjustable in position relatively to the feed-rolls; but in such devices the forming-roll was removed from its contiguous feed-roll a distance greater than the diameter of the wire, and this distance was varied whenever the forming-roll was adjustably moved. In such a form of construction a variation in the quality of the wire would produce a variation in the form of the successive coils. For example, should the resiliency of the wire be greater in one place than another it would not be permanently bent by the distant former to the same degree of curvature that other and softer portions would be; and as it is impracticable, if not impossible, to produce a long wire of exactly the same quality and temper throughout its length, the successive coils would necessarily differ in form, according to the temper and quality of the wire.

My invention consists in providing a wire-feeding-roll, upon which the wire is bent, with a forming-roll for bending the wire, concentrically revoluble in a pivoted supporting-frame about said feed-roll and distant therefrom a suitable distance to cause the two rolls to grip and concurrently feed and bend the wire as it passes between them, and in providing means for adjusting the position of the forming-roll in its supporting-frame, whereby it can be adapted for use in coiling wire of different sizes, together with the necessary co-operating mechanism, all as hereinafter more fully described, and pointed out in the claims.

Figure 19:
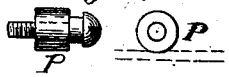
Figure 4:
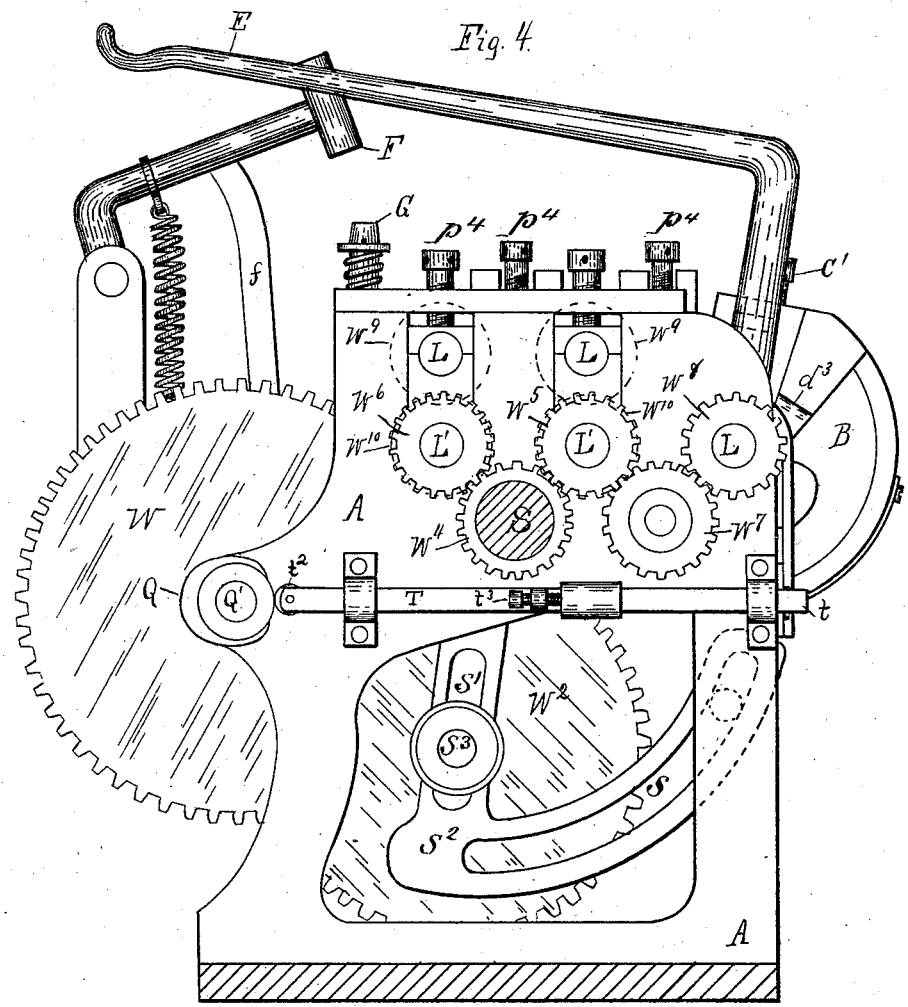
Figure 10:
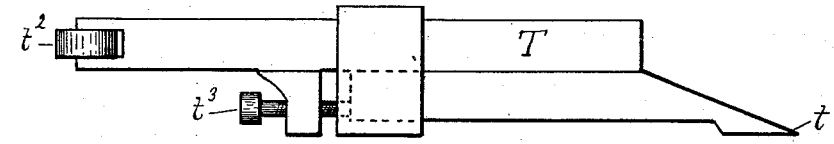
Figure 11:
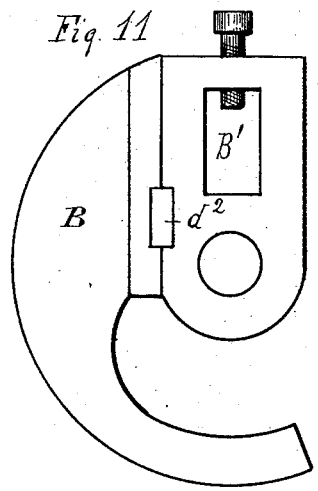
Figure 13:
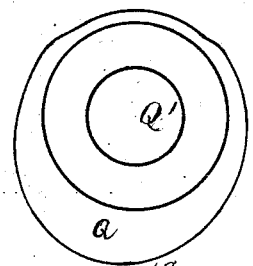
Figure 12:
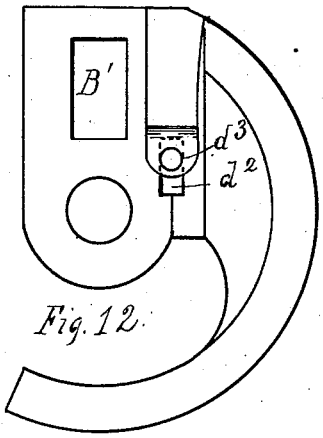
Figure 14:
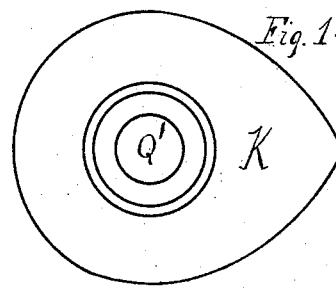
Figure 15:
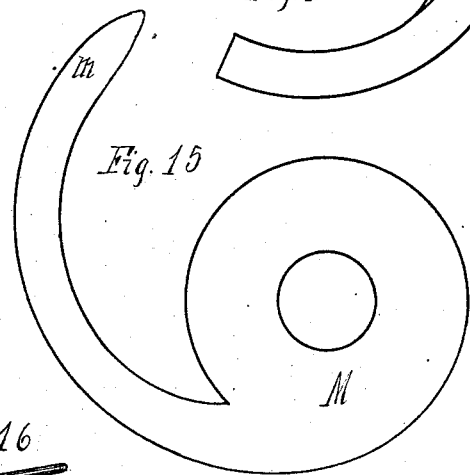
Figures 16, 17:
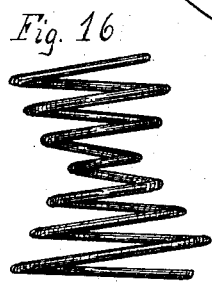
Figure 18:
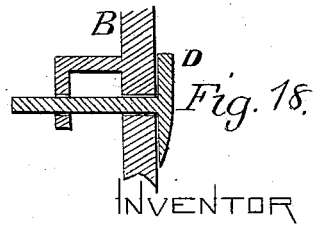

Figure 1 of the drawings is a front side elevation of my improved wire-coiling machine. Fig. 2 is a top plan view of same. Fig. 3 is an end elevation. Fig. 4 is a back side elevation. Figs. 5 and 6 are respectively front and cross-sectional views of one of the feed-rolls. Figs. 7, 8, and 9 are respectively front, side, and sectional views of the wire-deflector. Fig. 10 is a top plan view of a cam-operated slide for actuating, through slide R, the deflector. Fig. 11 is a front elevation of the detached frame which supports the forming-roll and the deflector. Fig. 12 is a back elevation of frame shown in Fig. 1. Fig. 13 is a side view of the deflector-operating cam. Fig. 14 is a side view of the cam for operating the pivoted frame which supports the forming-roll. Fig. 15 is a side view of the cam which operates the wire-severing device. Fig. 16 represents a double helical spring. Fig. 17 is a detail view in cross-section on line $x\,x$ of Fig. 1, and Fig. 18 is a view in detail of the side and edge of the fixed deflector. Fig. 19 is a detail view of the loose guide-roll between the grooved pulleys, both separate and on its screw-pivot.

A is the frame of the machine, which supports the various parts, including the wire-feeding rolls $a$, which are connected with each other and with the driving mechanism by gear-wheels, as shown in Fig. 4, by which they are actuated to feed a wire (shown by dotted lines in Fig. 1) along between the forming-roll C and the last feed-roll in the series. The forming-roll C is journaled in a box, (shown by dotted lines in Fig. 1,) which is supported by the frame B, pivoted concentrically with the feed-roll $a$. The box of the forming-roll is adapted to slide in a slot, B', in the frame to and from the last roll $a$, and is secured in the desired position by the adjusting-screw C'. The frame B is also provided with the wire-deflector D, adapted to slide laterally in a slot, $d^2$, in the pivoted frame. This deflector is shown in detail in Figs. 7, 8, and 9, Fig. 7 being the face view shown in Fig. 1 of the head, which is a metallic plate beveled to a thin edge on the side contiguous to the forming-roll, and Fig. 8 being a side elevation showing the shank $d'$ adapted to slide in the slot $d^2$, (shown in Figs. 11 and 12,) and $d$ the pin which slides in the aperture shown in guide $d^3$, and engages with the actuating-arm R' on the slide R, the slide being supported by and sliding on pins $r$, passing through slots $r'$ in the slide. The slide is actuated by another slide, T. (Shown in detail in Fig. 11.) This slide is provided at one end with a beveled point, $t$, which actuates the slide R. The slide T is provided at its other end with a frictional roll, $t^2$, which rides upon the cam Q. (Shown in detail in Fig. 13.) The cam is attached to shaft Q', which is actuated by the cogged wheel W, secured thereon. Wheel W is connected by wheels W' and $W^2$ with pinion $W^3$ on the main driving-shaft S. This shaft is also provided with gear-wheel $W^4$, which actuates the wheels $W^5$, $W^6$, $W^7$, and $W^8$ to drive the feed-roll shafts L L', said shafts being provided with meshing gears $W^9$ and $W^{10}$, (shown by dotted lines in Fig. 4,) which causes them to rotate in opposite directions, thereby impelling the wire introduced within the series of feed-rolls onward toward the forming-roll and deflectors. The shaft Q' is also provided with cam M, (shown detached in side elevation in Fig. 15,) which operates the hammer F. The hammer is pivoted to the frame at $e$, and is provided with an arm, $f$, which rides upon the cam, as shown in Fig. 1. As the spur $m$ of the cam passes from under the arm, after lifting the hammer, the latter falls upon the chisel-head G, to cut off the wire passing thereunder. The force of the downward blow of the hammer may be increased by means of a spring, as S'. There may be used an auxiliary chisel or edged anvil, $g$, beneath the chisel to cut the wire upon two sides. The same shaft, Q', is also provided with cam K, the office of which is to automatically actuate the pivoted frame B, which supports forming-roll C.

The slotted arm J, pivoted to the frame at J', carries a friction-roller, $j$, which rides upon the cam K, and is connected with the frame B by a link, H' H''. The frame B is also provided with a horizontal arm, E, adapted to receive a weight, which may be hung from the hook shown in the drawings. The tendency of the weight is to maintain the frame B in a vertical position in which the forming-roll is vertically over the last of the feed-rolls, in which position wire passing through the machine would remain unbent.

The action of the cam K is against the resistance of the weight to turn the frame B upon its pivot, to bend the passing wire. The more the frame is revolved or turned the more will the wire be bent.

The action of the cam K upon the movable frame may be modified by means of the adjustable connection of the link H' H'' with arm J. A spur from the link, adapted to slide longitudinally of the slot shown in the arm, can be held at any desired point therein by the nut $J^2$. The nearer the pivot of the arm the end of the link is secured the less will be its movement. The link may also be adjustable longitudinally by means of the threaded nut I, fitting upon the threaded end of section H', which passes through a correspondingly-threaded aperture in the contiguous ends of section H'', as shown in Fig. 1.

The operation of the machine in forming a double helical coil or bed spring, like that shown in Fig. 16, is as follows: One end of a wire, of any desired length, is inserted between the feed-rolls, and by them forced along over the anvil $g$, to and past the forming-roll C and deflector D, as shown by dotted lines in Fig. 1. The rolls and cams, being all driven by a common shaft, S, their relative action is automatic, and the cams being all secured to shaft Q', the whole duty of each cam is performed at every rotation of the shaft. When the cam K is in the position shown in Fig. 1, the forming-roll is turned over almost to its extreme limit of revolution, and the wire is bent to form the small coils of the spring. When the cam advances a half-revolution, that portion having the shorter radius is in contact with the friction-roller on arm J, and the weighted arm E forces the former-roll up nearer a vertical position relatively to the last feed-roll, and the larger coils of the bed-spring are formed. As the wire passes from the former-roll, it strikes the deflector, secured on the movable frame B by a screw or bolt, as shown, and is bent or deflected laterally from its straight line of passage through the feed-rolls. A fixed deflector would separate the coils of the spring by a fixed angle of deflection; but the sliding deflector D, acted upon by the cam Q, through slides T and R, automatically varies the angle of deflection, which separates some of the coils more widely than others. The fixed deflector D' is essentially the same in form as the deflector D, and is secured to the frame B so as to be vertically adjusted by a screw-bolt and nut, as shown in Fig. 1 of the drawings. The fixed deflector being unnecessary when the adjustable deflector is used, it is not shown in all the figures. Thus at each revolution of the shaft Q, I am able to make a complete spring, and, unless the springs are cut from the main wire, a series of connected springs. I prefer, however, to cut off each spring as made, and for this purpose make use of the chisel $g'$. (Shown partly by dotted lines in Fig. 1.) When the wire has reached the proper point to be cut off, the arm $m$ of cam M, which has lifted the hammer F, passes from under the arm $f$, and the hammer falls upon the chisel-head with sufficient force to partly sever the wire, leaving the connection sufficiently strong to draw the remaining wire forward between the feed-rolls until the partly-severed portion reaches the forming-roll, which bends and breaks the wire at that point.

By employing differently-shaped cams I am able to produce differently-shaped coils, and to vary the degree of deflection of the coils as desired. A limited variation can also be produced with the same cams by adjusting the length of the link H' H" or its point of attachment to arm J, as before described. The slide T is also adjustable in length, being made in two sections, and having an adjusting-screw, $t^3$, for sliding one section upon the other, as shown in Fig. 10.

The rolls may some or all of them be grooved, as shown in Figs. 2, 5, and 6, to prevent lateral slipping of the wire thereon.

The pivoted frame B may be turned by hand to cause the forming-roll C to bend and form the coils of wire, either by grasping the frame itself or the weight-supporting arm E. The frame may also be brought back to its normal or vertical position by a spring, E', (shown by dotted lines in Fig. 1,) instead of by a weight on arm E, when desired. The deflector D may also be operated by hand when desired.

The natural tension of the wire, as it is fed against the deflector, is sufficient to force back the slides R and T and keep the friction-roll $t^2$ in contact with the operating-cam Q without the use of weights or springs.

The screws $a'$ serve to adjust the position of the feed-rolls $a$ relative to each other. By turning the screws to the right the upper roll is forced down nearer the lower roll to grip the wire more firmly, and by turning the screw back the rolls may be farther separated to admit a larger wire.

P represents the loose guide-rolls between the grooved rolls $a$, said guide-rolls being mounted on slotted slides $p$, adjustable by means of the screws $p'$ in the slots $p^2$. These slides $p$ are cut out at $p^3$ to slide in the T-shaped projection $a^2$, through which passes the adjusting-screws $p^4$, so as to bear against the slides for the purpose of adjusting them and with them the loose rolls.

The form of the idlers is not essential, and no claim is made thereto.

I make the arc-slot S and the straight slot S' in the curved and straight arms, respectively, of the segment $S^2$, which is pivoted to the machine-frame at its end directly above the shaft $S^3$ of the wheel $W^2$. The segment is capable of being swung on its pivot, in order to be adjusted for different sizes of wheels $W^2$. A set-screw passes through slot S and screws into the frame, so as to hold the segment at whatever adjustment it may be placed.

The object of adjusting the forming-roll, by sliding its box in slot B' on a line radial to the pivot of frame B, is to accommodate the machine to different sizes of wires.

In changing the adjustment from that adapted for small wire to that adapted to larger wire, the journal-box of the forming-roll is permitted to slide outward from the pivotal center of the supporting-frame B, by turning back the adjusting-screw C'.

I have, by dotted line in Fig. 2, indicated the position of a coil of wire as it issues from the machine.

What I claim as new, and desire to secure by Letters Patent, is—

1. In a wire-coiling machine, the combination, with a series of feeding-rolls, $a$, of a rotary forming-roll in a pivoted frame rotating concentrically about one of the feed-rolls, and means, substantially as described, for rotating said feed-roll and revolving the frame carrying the forming-roll about the feed-roll, whereby a wire can be fed between said rolls and bent by one of said rolls about the other, substantially as described, and for the purposes set forth.

2. In a wire-coiling machine having one or more pairs of feed-rolls for feeding wire to a forming-roll, the combination, with a separate feed-roll, of a roll-supporting frame, B, pivoted concentrically with said feed-roll, and a forming-roll, C, provided with journal-boxes movable in said frame on a line passing radially through its pivot, substantially as described, and for the purposes set forth.

3. In a wire-coiling machine, the combination, with a series of feeding-rolls, $a$, of a forming-roll carried in a frame which is revoluble about one of the feed-rolls and pivoted concentrically therewith, the peripheries of the two rolls being separated from each other a distance about equal to the diameter of the wire to be coiled, whereby the rolls are adapted to concurrently feed and bend the wire, substantially as described, and for the purposes set forth.

In testimony whereof I have hereunto set my hand this 26th day of December, 1885.

GEORGE HILDRETH.

Witnesses:
   GEO. A. MOSHER,
   W. H. HOLLISTER, Jr.